(12) United States Patent
Xu

(10) Patent No.: US 11,427,064 B2
(45) Date of Patent: Aug. 30, 2022

(54) LATCH STRUCTURE OF TONNEAU COVER

(71) Applicant: Cixi City Liyuan Auto Parts Co., Ltd., Cixi (CN)

(72) Inventor: Enli Xu, Cixi (CN)

(73) Assignee: CIXI CITY LIYUAN AUTO PARTS CO., LTD., Cixi (CN)

( * ) Notice: Subject to any disclaimer, the term of this patent is extended or adjusted under 35 U.S.C. 154(b) by 1007 days.

(21) Appl. No.: 16/133,656

(22) Filed: Sep. 17, 2018

(65) Prior Publication Data

US 2020/0062095 A1  Feb. 27, 2020

(30) Foreign Application Priority Data

Aug. 21, 2018 (CN) .......................... 201810955255.1

(51) Int. Cl.
*B60J 7/19* (2006.01)
*B60J 7/10* (2006.01)
*B60J 10/90* (2016.01)

(52) U.S. Cl.
CPC .............. *B60J 7/198* (2013.01); *B60J 10/90* (2016.02); *B60J 7/10* (2013.01); *B60J 7/102* (2013.01); *B60J 7/104* (2013.01)

(58) Field of Classification Search
CPC ....... B60J 7/10; B60J 7/19; B60J 7/102; B60J 7/104; B60J 7/141; B60J 7/185; B60J 7/198; B60J 7/1607; B60J 7/1858; B60J 10/30; B60J 10/90; B60P 7/04; E05D 3/125; E05D 5/14; E05C 19/10; B62D 33/04; Y10S 292/44; Y10S 292/49

USPC .................. 292/5, 256.73, 256.75, DIG. 11; 296/100.01, 100.02, 100.04, 100.06, 296/100.07, 100.16, 136.03
See application file for complete search history.

(56) References Cited

U.S. PATENT DOCUMENTS

| 6,053,558 | A | * | 4/2000 | Weldy | ...................... | B60J 7/102 |
| | | | | | | 160/381 |
| 9,482,039 | B1 | * | 11/2016 | Xu | .......................... | E05D 3/125 |
| 9,487,071 | B1 | * | 11/2016 | Yue | ........................ | B60J 7/198 |
| 2004/0245799 | A1 | * | 12/2004 | Rusu | ....................... | F15B 7/006 |
| | | | | | | 296/100.06 |
| 2006/0208524 | A1 | * | 9/2006 | Brown | ..................... | B60J 7/104 |
| | | | | | | 296/100.01 |

(Continued)

*Primary Examiner* — Dennis H Pedder
*Assistant Examiner* — Joyce Eileen Hill
(74) *Attorney, Agent, or Firm* — Kilpatrick Townsend & Stockton, LLP

(57) ABSTRACT

A truck cover system including a rail, a clamp structure, a latch structure, and a weather seal. The rail defines a cover slot for a cover that extends over a truck bed. The clamp structure is configured to couple to a truck wall of the truck. The clamp structure includes a clamp fastener configured to tighten the clamp structure against the truck wall. The clamp structure also includes a connecting member extending in the vertical direction when the truck cover system is employed and the clamp structure is coupled to the truck wall. The latch structure is configured to couple to the rail and to the clamp structure. The latch structure includes a rail interface configured to couple to the rail and a latch body including a plurality of laterally-offset locking positions. The connecting member is configured to lock to one of the plurality of laterally-offset locking positions.

16 Claims, 9 Drawing Sheets

(56) References Cited

U.S. PATENT DOCUMENTS

| | | | | |
|---|---|---|---|---|
| 2011/0260493 A1* | 10/2011 | Xu | ........................... | B60J 7/198 |
| | | | | 296/100.07 |
| 2012/0274091 A1* | 11/2012 | Yue | ......................... | B60J 7/141 |
| | | | | 296/100.04 |
| 2013/0015678 A1* | 1/2013 | Williamson | ............ | E05C 19/10 |
| | | | | 296/100.09 |
| 2013/0341960 A1* | 12/2013 | Garska | ..................... | B60J 7/102 |
| | | | | 296/100.18 |
| 2016/0114666 A1* | 4/2016 | Xu | ........................... | B60P 7/02 |
| | | | | 296/100.07 |
| 2017/0066311 A1* | 3/2017 | Facchinello | ............. | B60J 7/198 |

* cited by examiner

LATCH STRUCTURE OF TONNEAU COVER

FIELD OF THE INVENTION

The disclosure generally relates to a compartment cover system for trucks.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Pickup trucks are widely used vehicles that enable transportation of cargo as well as passengers. Passengers are typically housed in the truck cab while cargo can be stored in the truck bed. The truck bed is usually rectangularly shaped and open to the environment to facilitate loading and carrying of large and/or oddly shaped cargo. However, exposing the truck bed to the environment may leave the truck bed and/or cargo unprotected. For example, the truck bed and/or cargo may be exposed to dirt, precipitation (e.g., rain, snow, hail), etc. Accordingly, some truck owners purchase truck covers to protect the truck bed as well as items stored in the truck bed.

SUMMARY OF THE INVENTION

The present disclosure is directed to a truck cover system. In some embodiments of the present invention, a truck cover system is provided. The truck cover system includes a rail defining a cover slot configured to couple to a cover that extends over a truck bed of a truck. The truck cover system also includes a clamp structure configured to couple to a truck wall of the truck. In some embodiments, the clamp structure includes a clamp fastener configured to tighten the clamp structure against the truck wall and a connecting member extending in the vertical direction when the truck cover system is employed and the clamp structure is coupled to the truck wall. The truck cover system further includes a latch structure configured to couple to the rail and to the clamp structure. In some embodiments, the latch structure includes a rail interface configured to couple to the rail and a latch body including a plurality of laterally-offset locking positions, wherein the connecting member is configured to lock to one of the plurality of laterally-offset locking positions. The truck cover system further includes a weather seal coupled to an end of the rail, the weather seal forming a seal between the truck and the rail when the truck cover system is employed.

In some embodiments, the latch structure includes a plurality of slots positioned on the latch body corresponding to the plurality of laterally-offset locking positions, the plurality of slots allowing the clamp structure to rotate vertically upward with respect to the latch structure such that the clamp structure may become at least partially flush with the latch structure while the clamp structure is coupled to the latch structure. In some embodiments, the latch structure further includes a plurality of front apertures positioned on the latch body corresponding to the plurality of laterally-offset locking positions. In some embodiments, the latch structure further includes a plurality of rear apertures positioned on the latch body corresponding to the plurality of laterally-offset locking positions, the plurality of front apertures and the plurality of rear apertures allowing locking of the connecting member to each of the plurality of laterally-offset locking positions using a main fastener.

In some embodiments, the main fastener includes a bolt and a nut, the bolt being insertable through one or both of the plurality of front apertures and the plurality of rear apertures. In some embodiments, the plurality of front apertures are vertically offset from the plurality of slots when the truck cover system is employed. In some embodiments, the connecting member comprises a pivot member coupled to an elongated member, wherein the pivot member is configured to receive the main fastener and wherein the elongated member is configured to rotate with respect to the pivot member such that the elongated member is rotatable into one of the plurality of slots when the clamp structure is rotated with respect to the latch structure. In some embodiments, the latch structure further includes a central channel extending laterally across the latch structure. In some embodiments, the connecting member is inserted into the central channel in order to lock the connecting member to one of the plurality of laterally-offset locking positions. In some embodiments, the latch structure further includes a latch insert configured to be inserted at least partially within the central channel and to intersect each of the plurality of laterally-offset locking positions.

In some embodiments, the latch structure further includes a plurality of beams extending at least partially across the central channel so as to secure the latch insert when the latch insert is inserted within the central channel. In some embodiments, the latch structure further includes a plurality of separators extending at least partially across the central channel.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments discussed below include a truck cover system with a latch structure and a clamp structure. The clamp structure is laterally adjustable with respect to the latch structure so as to enable coupling of the truck cover system to trucks with different wall overhang sizes and different truck bed widths. The latch structure and the clamp structure are configured so as to allow significant flexibility in the shape and size of compatible truck types while maintaining the durability of the device. The truck cover system may also include a weather seal that enhances sealing with the truck. For example, the weather seal may include sealing fins of different lengths that engage a surface of the truck.

Figure 1:
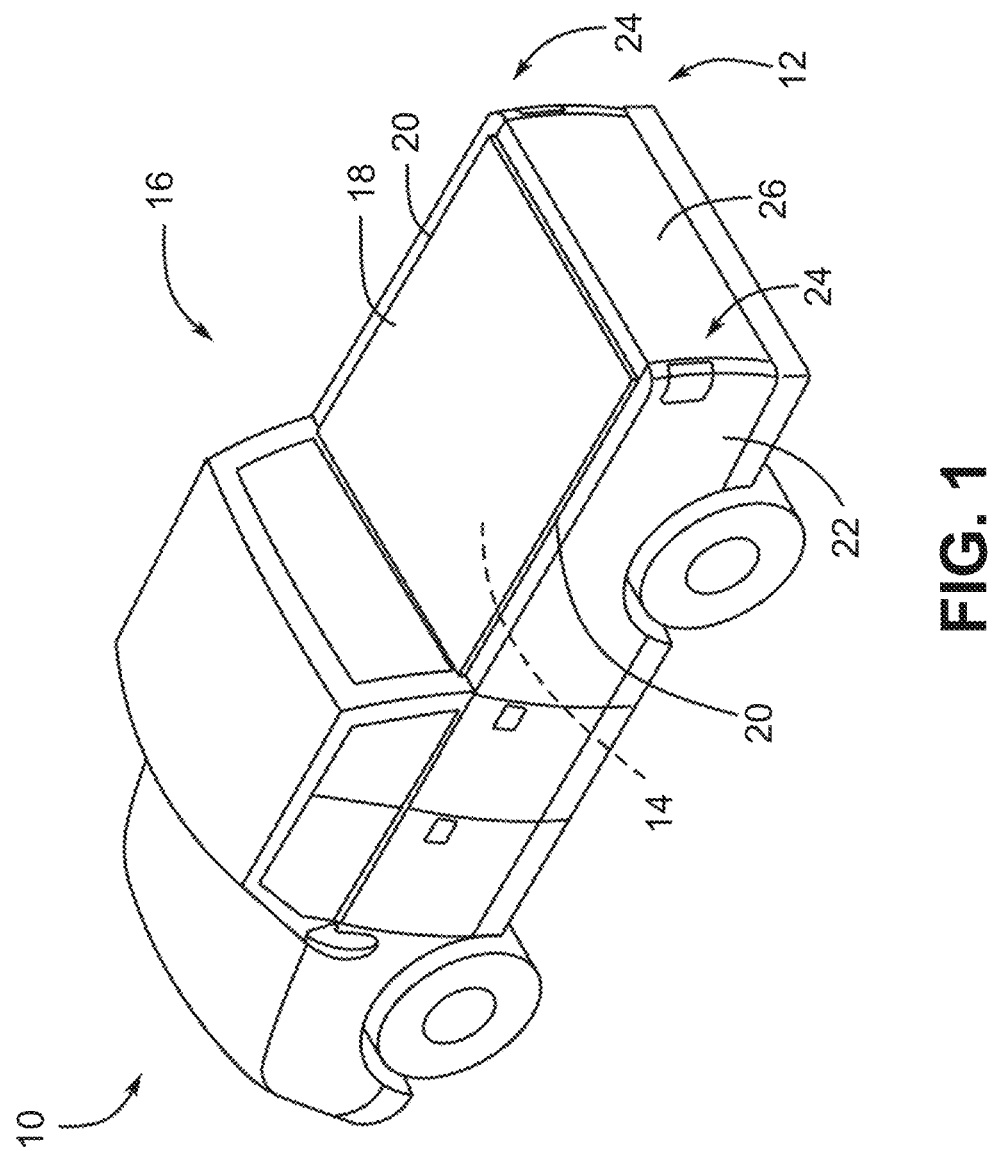
FIG. 1 is a perspective view of an embodiment of a truck with a truck cover system.

FIG. 1 is a perspective view of an embodiment of a truck 10 with a truck cover system 12. As illustrated, truck cover system 12 covers a compartment 14 formed by a truck bed 16 to protect an interior of truck bed 16 and items that may be stored in compartment 14. For example, truck cover system 12 may block dirt and precipitation from entering truck bed 16. Truck cover system 12 may include a cover 18 (e.g., soft or hard cover) that extends over compartment 14. Cover 18 may be made out of a variety of materials including fabric, plastic (e.g., vinyl), etc. Cover 18 couples to truck bed 16 with rails 20 that in turn couple to truck walls 22 (e.g., truck bed walls). To block removal of cover 18 and/or access to truck bed 16, truck cover system 12 may include one or more latch structures 24. For example, truck cover system 12 may include two latch structures 24 one at each corner of the truck bed 16 next to a tailgate 26. In operation, latch structures 24 couple to rails 20 to tension/pull cover 18 into an extended position (e.g., taught position) that facilitates the flow of precipitation off of truck cover system 12 as well as enhancing the aesthetic appearance of truck cover system 12.

Figure 2:
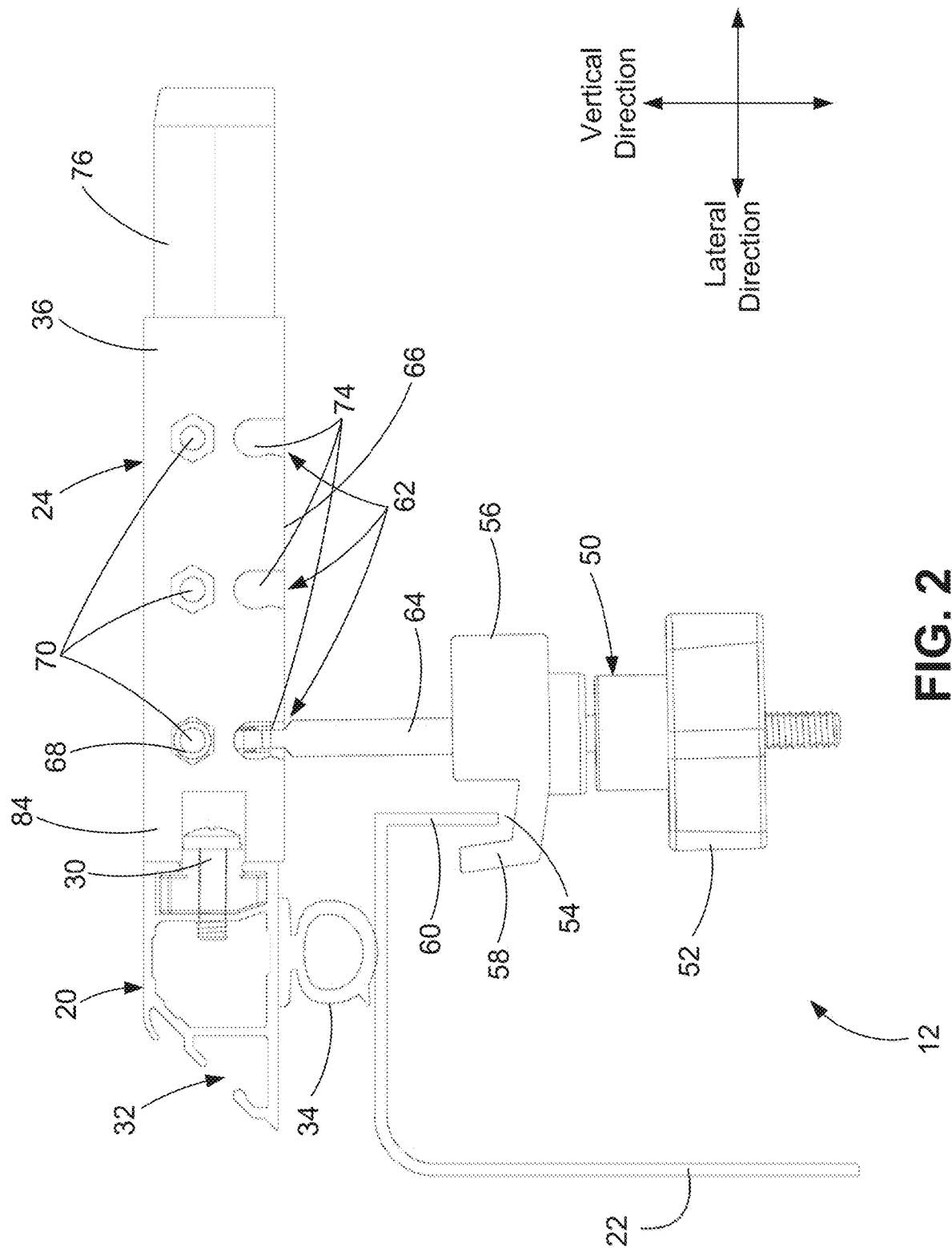
FIG. 2 is a partial side view of an embodiment of a truck cover system coupled to a truck wall.

FIG. 2 is a partial side view of an embodiment of truck cover system 12 coupled to truck wall 22. As illustrated, when truck cover system 12 is employed (i.e., when truck cover system 12 is coupled to truck 10), latch structure 24 is coupled to rail 20 in the lateral direction using, in some embodiments, a latch fastener 30 (e.g., screw, bolt, nut, etc.). Rail 20 may include one or more walls defining a cover slot 32 configured to receive and secure an end of cover 18. In some embodiments, a weather seal 34 (e.g., rubber, plastic) may rest between the bottom side of rail 20 and the top side of truck wall 22 to block precipitation, dirt, etc. from entering the compartment 14. In some embodiments, latch structure 24 may include a latch body 36 comprising one or more laterally-offset locking positions 62 for coupling to a clamp structure 50.

As illustrated, when truck cover system 12 is employed, clamp structure 50 is coupled to truck wall 22 by tightening clamp structure 50 against truck wall 22 in the upward vertical direction by, for example, rotating a clamp fastener 52. Specifically, clamp structure 50 may include a clamp 56 comprising a clamp lip 58 that defines a clamp slot 54. Clamp slot 54 may be configured to receive a truck wall lip 60 of truck wall 22 and tighten against truck wall lip 60 when clamp fastener 52 is rotated. In some embodiments, clamp structure 50 includes a connecting member 64 for coupling to latch structure 24. Connecting member 64 may be at least partially elongated so as to be insertable into a central channel 66 of latch structure 24. To lock connecting member 64 to one of laterally-offset locking positions 62, a main fastener 68 may be inserted into one of front apertures 70 and/or into one of rear apertures 72. Each of front apertures 70 may correspond to (i.e., be aligned in the lateral direction with) one of laterally-offset locking positions 62 and, similarly, each of rear apertures 72 may correspond to (i.e., be aligned in the lateral direction with) one of laterally-offset locking positions 62.

In this manner, clamp structure 50 may be coupled to latch structure 24 at any one of laterally-offset locking positions 62, allowing truck cover system 12 to accommodate a wide range of sizes of truck bed 16 and shapes of truck wall lip 60. Another advantage of truck cover system 12 is that clamp structure 50 may be attached to latch structure 24 after positioning rail 20 and latch structure 24 above truck bed 16. Therefore, the width of truck bed 16 need not be determined prior to positioning rail 20 and latch structure 24 above truck bed 16.

In some embodiments, latch structure 24 includes one or more slots 74. Each of slots 74 may correspond to one of laterally-offset locking positions 62 (i.e., be aligned in the lateral direction) and may be positioned below each of front apertures 70 and rear apertures 72 in the downward vertical direction. Slots 74 allow clamp structure 50 to rotate vertically upward such that clamp structure 50 may become at least partially flush with latch structure 24 while clamp structure 50 remains coupled to latch structure 24. This may be useful for storage, installation, and/or removal of truck cover system 12. For example, during removal of truck cover system 12, clamp fastener 52 may be rotated so as to decouple clamp structure 50 from truck wall 22, and thereafter clamp structure 50 may be rotated vertically upward such that connecting member 64 is at least partially resting within one of slots 74 and such that clamp structure 50 is at least partially flush with latch structure 24 and/or rail 20.

In some embodiments, latch structure 24 includes a cross beam interface for coupling to a cross beam in the lateral direction. Accordingly, two latch structures 24 may be positioned on opposite ends of truck bed 16 and may couple to the same cross beam. In some embodiments, truck cover system 12 may comprise four latch structures 24 positioned at each corner of truck bed 16, two of which being coupled to a first cross beam and the other two being coupled to a second cross beam.

In some embodiments, latch structure 24 includes a rail interface 84 for coupling to rail 20 in the lateral direction. Rail interface 84 may couple to rail 20 using latch fastener 30 or, in some embodiments, may be insertable into a receiving portion of rail 20 and/or may employ a snap-fit connection. Rail interface 84 may be sized such that a top surface of latch structure 24 is flush with a top surface of rail 20 and such that a bottom surface of latch structure 24 is flush with a bottom surface of rail 20.

Figure 3:
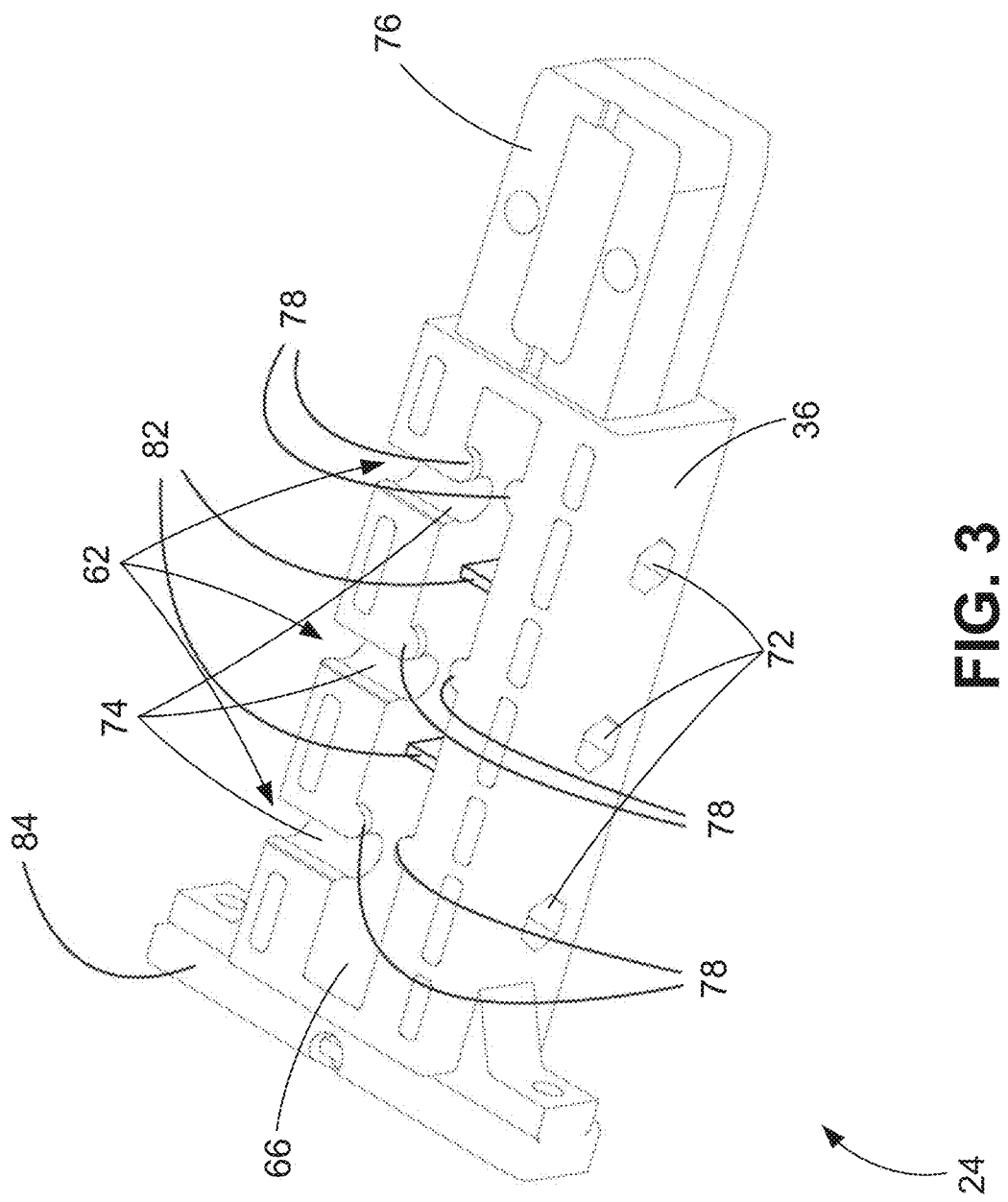
FIG. 3 is a perspective view of an embodiment of a latch structure.

FIG. 3 is a perspective view of an embodiment of latch structure 24. As illustrated, central channel 66 extends across latch structure 24 in the lateral direction. In some embodiments, latch structure 24 includes one or more beams 78 extending at least partially across central channel 66. In some embodiments, beams 78 serve to secure a latch insert 80 that is insertable at least partially within central channel 66. Beams 78 may be rounded in shape as illustrated in FIG. 3 so as to not interfere with insertion of connecting member 64 into one of laterally-offset locking positions 62. In some embodiments, latch structure 24 includes one or more separators 82 extending at least partially across central channel 66 that serve to separate laterally-offset locking positions 62 to facility insertion of connecting member 64. In some embodiments, each of separators 82 are positioned at midpoints between adjacent locking positions. In other embodiments, or in the same embodiments, separators 82 are positioned based on a width of connecting member 64 such that insertion of connecting member 64 into one of laterally-offset locking positions 62 is guided by one or more of separators 82.

Figure 4:
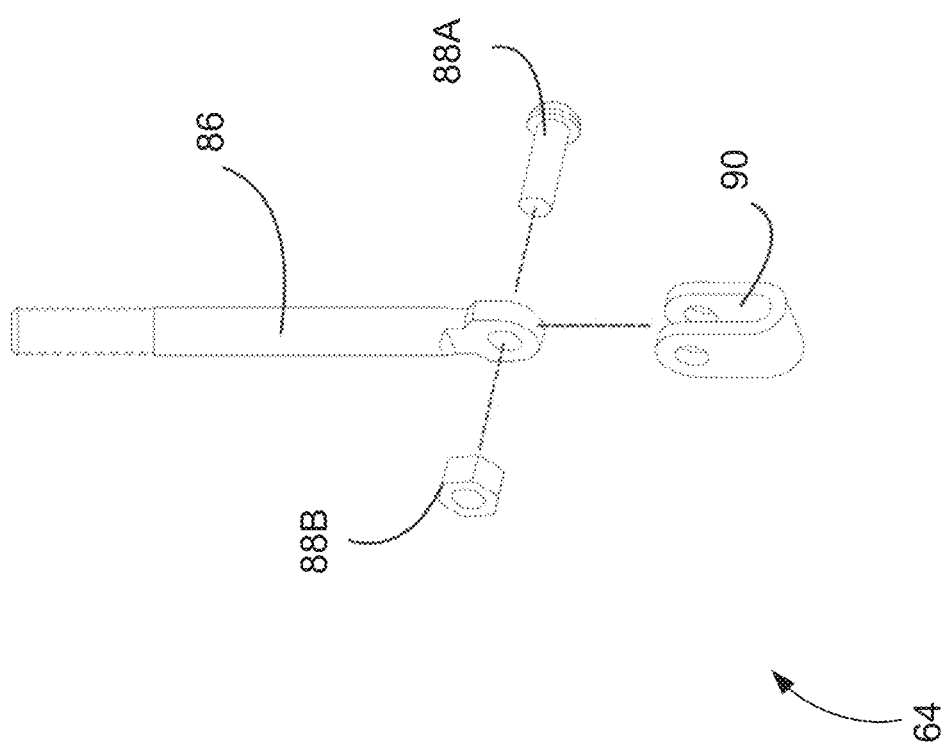
FIG. 4 is an exploded perspective view of an embodiment of a connecting member of a clamp structure.

FIG. 4 is an exploded perspective view of an embodiment of connecting member 64 of clamp structure 50. As illustrated, connecting member 64 may include an elongated member 86. Elongated member 86 may be rod-like and may, in some embodiments, include an externally threaded portion on one end that couples to clamp 56 and/or clamp fastener 52. In some embodiments, connecting member 64 further includes a connecting member fastener 88 and a pivot member 90. Pivot member 90 may be rotatably coupled to elongated member 86 using connecting member fastener 88 (comprising, e.g., a bolt and a nut) such that pivot member 90 may rotate with respect to elongated member 86. Pivot member 90 may be U-shaped and may, when coupled to elongated member 86, form an aperture for receiving main fastener 68. In some embodiments, elongated member 86 is configured to rotate with respect to pivot member 90 into one of slots 74 when clamp structure 50 is rotated with respect to latch structure 24. In some embodiments, the length of pivot member 90 is determined based on the vertical offset between slots 74 and front apertures 70 and/or the vertical offset between slots 74 and rear apertures 72.

Figure 5:
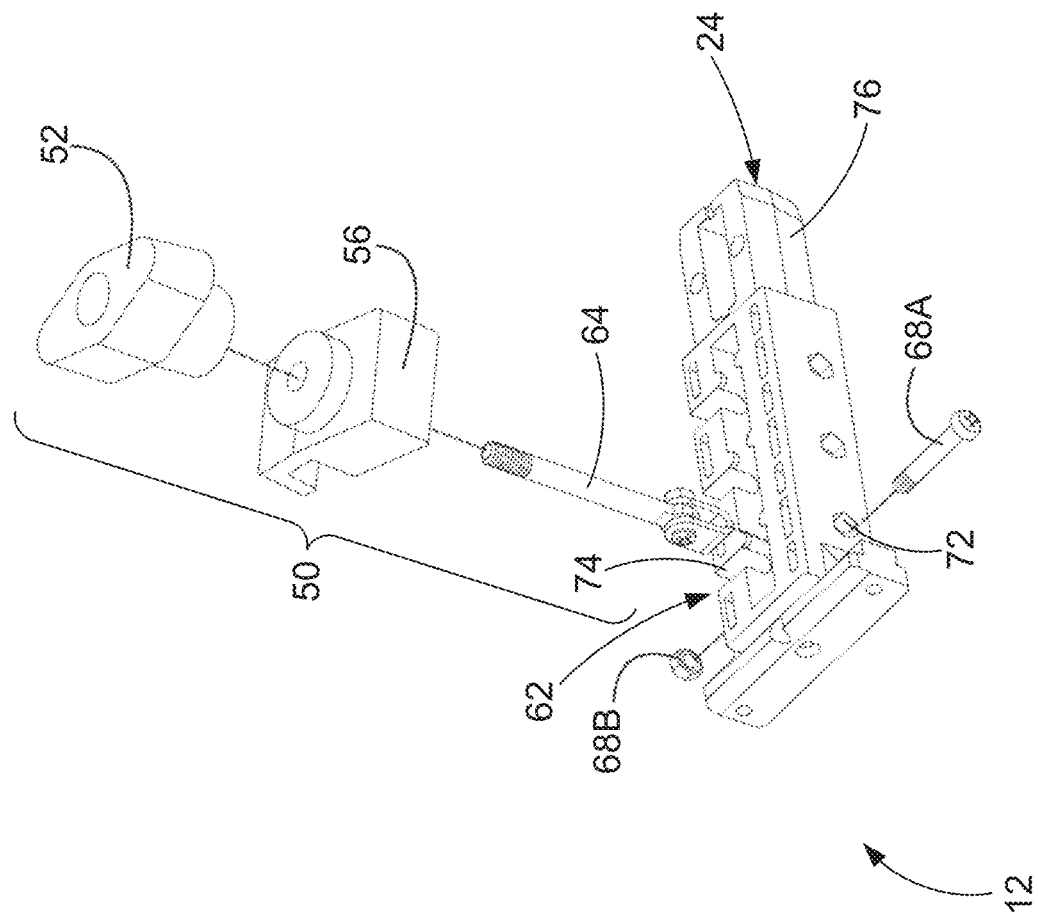
FIG. 5 is an exploded perspective view of an embodiment of a truck cover system.

FIG. 5 is an exploded perspective view of an embodiment of truck cover system 12. In the embodiment shown in FIG. 5, truck cover system 12 is assembled by inserting connecting member 64 into one of laterally-offset locking positions 62, locking connecting member 64 to one of laterally-offset locking positions 64 by inserting main fastener 68 into one of rear apertures 72, and attaching clamp 56 and clamp fastener 52 to the externally threaded end of connecting member 64. Alternatively or additionally, main fastener 68 or a component of main fastener 68 (e.g., a nut) may be inserted into one of front apertures 70 to lock connecting member 64 to one of laterally-offset locking positions 64. In one embodiment as shown in FIG. 5, main fastener 68 may include a bolt 68A and a nut 68B. For example, bolt 68A is insertable through one of front apertures 70 and one of rear apertures 72.

Figure 6:
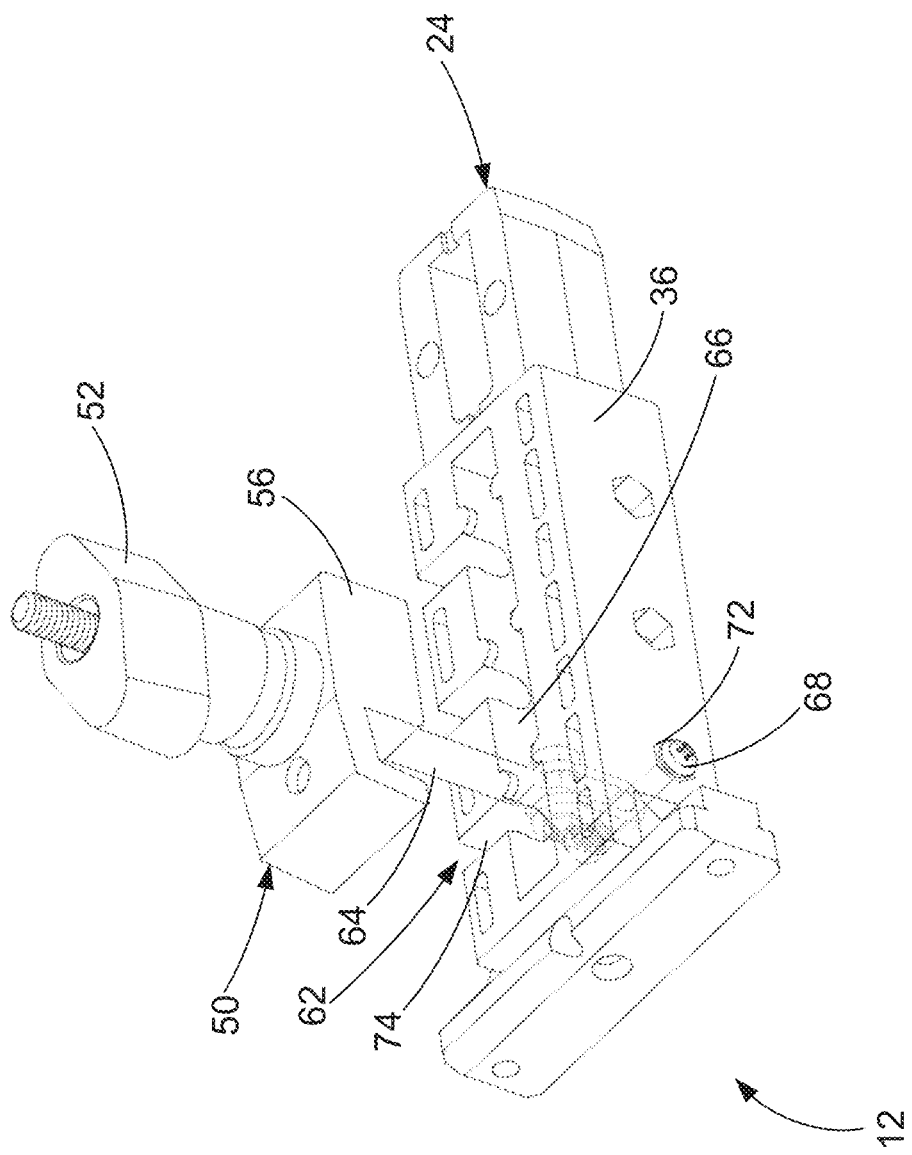
FIG. 6 is a perspective view of an embodiment of a truck cover system.

FIG. 6 is a partially transparent perspective view of an embodiment of truck cover system 12. As illustrated, when connecting member 64 of clamp structure 50 is locked to one of laterally-offset locking positions 64 of latch structure 24, the connection point between pivot member 90 and elongated member 86 is aligned with slots 74 in the vertical direction. As also illustrated, connecting member fastener 88 may be shaped so as to reside within central channel 66 when connecting member 64 is inserted into central channel 66, therefore protecting connecting member fastener 88 from damage due to external forces applied to latch cover system 12.

Figure 7:
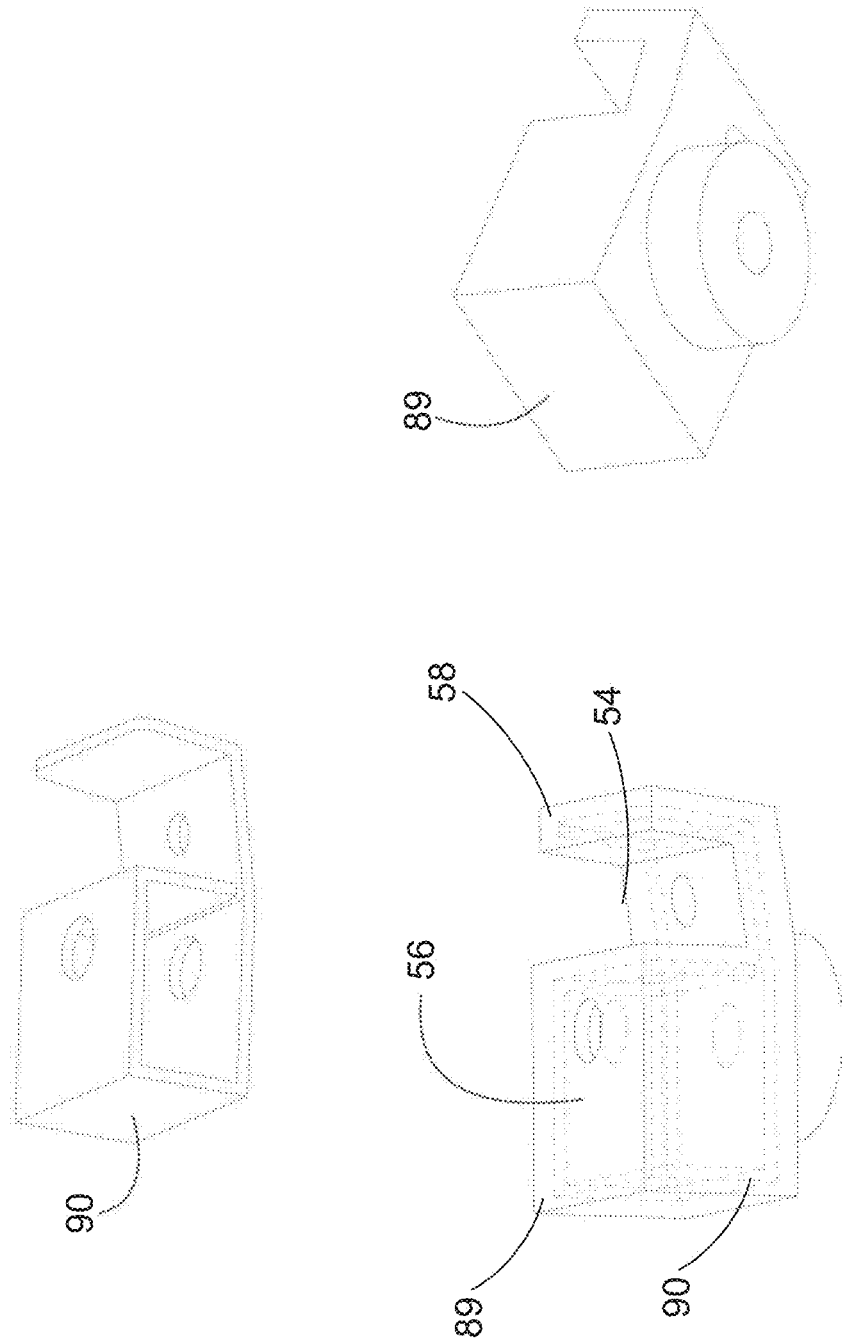
FIG. 7 shows several perspective views of an embodiment of a clamp of a clamp structure.

FIG. 7 shows several perspective views of an embodiment of clamp 56 and the various components included in clamp 56. As illustrated, clamp 56 may include a claim casing 89 built around a clamp interior structure 90. In some instances, claim casing 89 may be made from a durable yet non-damaging material such as a hard plastic, and clamp interior structure 90 may be metal or may be a material similar to claim casing 89. In some embodiments, claim casing 89 and clamp interior structure 90 may be manufactured separately and later combined by inserting clamp interior structure 90 into claim casing 89. In other embodiments, claim casing 89 is molded around an already fabricated clamp interior structure 90, among other possibilities. Each of claim casing 89 and clamp interior structure 90 may include various apertures for receiving elongated member 86 of connecting member 64.

Figure 8:
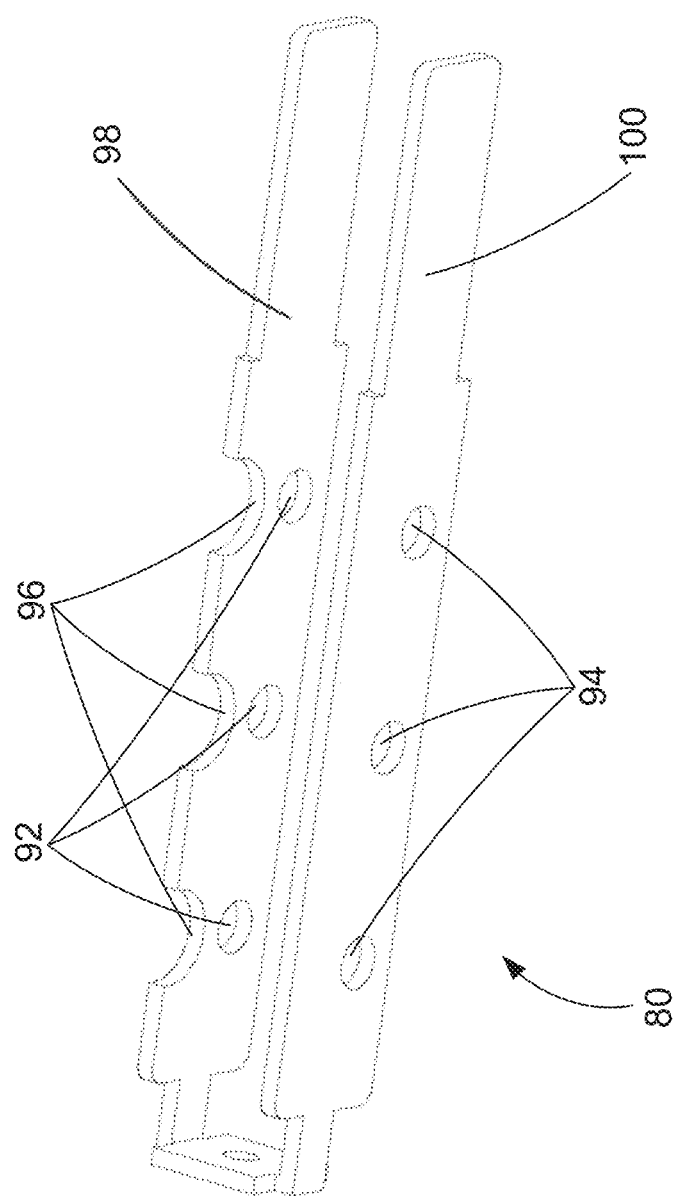
FIG. 8 is a perspective view of a latch insert of a latch structure.

FIG. 8 is a perspective view of latch insert 80. As illustrated, latch insert 80 may include one or more front insert apertures 92, one or more rear insert apertures 94, one or more insert slots 96, a front plate 98, and a rear plate 100. Front insert apertures 92 may be positioned such that, when latch insert 80 is inserted into central channel 66, they are at least partially aligned with front apertures 70. Similarly, rear insert apertures 94 may be positioned such that, when latch insert 80 is inserted into central channel 66, they are at least partially aligned with rear apertures 72. Similarly, insert slots 96 may be positioned such that, when latch insert 80 is inserted into central channel 66, they are at least partially aligned with slots 74.

Figure 9:
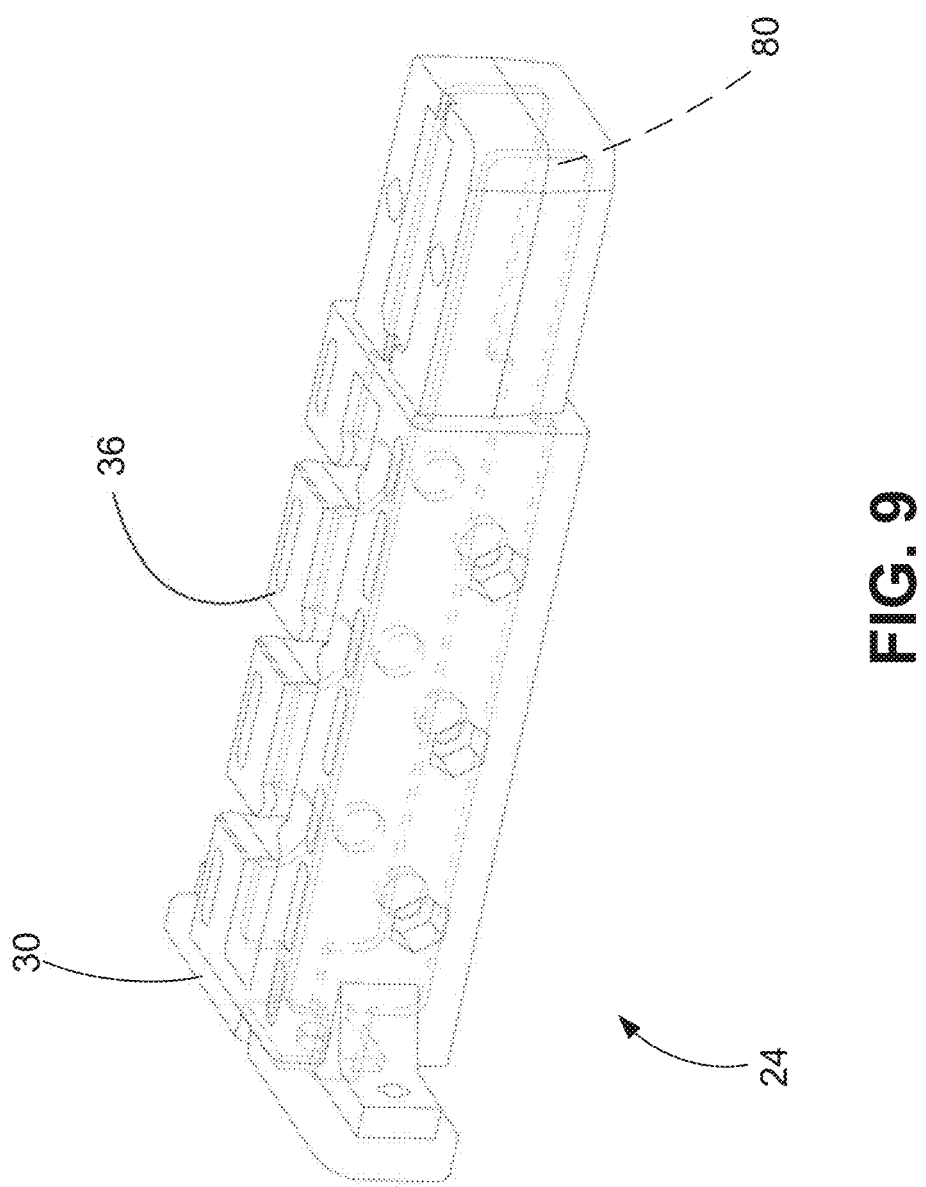
FIG. 9 is a perspective view of an embodiment of a latch structure.

FIG. 9 is a partially transparent perspective view of an embodiment of latch structure 24 showing latch insert 80 within latch body 36. In some embodiments, latch insert 80 may be inserted into latch body 36 via a hole positioned on rail interface 84. Accordingly, removal of latch insert 80 through the hole is prevented when latch structure 24 is coupled to rail 20. In some embodiments, latch insert 80 includes an aperture for receiving latch fastener 30 so as to allow a secure connection between latch insert 80 and rail 20.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:
1. A truck cover system comprising:
   a rail defining a cover slot configured to couple to a cover that extends over a truck bed of a truck;
   a clamp structure configured to couple to a truck wall of the truck, the clamp structure comprising:
   a clamp fastener configured to tighten the clamp structure against the truck wall; and
   a connecting member extending in the vertical direction when the truck cover system is employed and the clamp structure is coupled to the truck wall;
   a latch structure configured to couple to the rail and to the clamp structure, the latch structure comprising:
   a rail interface configured to couple to the rail; and
   a latch body including a plurality of laterally-offset locking positions, wherein the connecting member is configured to lock to one of the plurality of laterally-offset locking positions;
   a central channel extending laterally across the latch structure, wherein the connecting member is inserted into the central channel in order to lock the connecting member to one of the plurality of laterally-offset locking positions;
a latch insert configured to be inserted at least partially within the central channel and to intersect each of the plurality of laterally-offset locking positions; and
a weather seal coupled to an end of the rail, wherein the weather seal forms a seal between the truck and the rail when the truck cover system is employed.

2. The truck cover system of claim 1, wherein the latch structure further comprises:
a plurality of slots positioned on the latch body corresponding to the plurality of laterally-offset locking positions, the plurality of slots allowing the clamp structure to rotate vertically upward with respect to the latch structure such that the clamp structure may become at least partially flush with the latch structure while the clamp structure is coupled to the latch structure.

3. The truck cover system of claim 2, wherein the latch structure further comprises:
a plurality of front apertures positioned on the latch body corresponding to the plurality of laterally-offset locking positions; and
a plurality of rear apertures positioned on the latch body corresponding to the plurality of laterally-offset locking positions, wherein the plurality of front apertures and the plurality of rear apertures allow locking of the connecting member to each of the plurality of laterally-offset locking positions using a main fastener.

4. The truck cover system of claim 3, wherein the main fastener includes a bolt and a nut, wherein the bolt is insertable through one or both of the plurality of front apertures and the plurality of rear apertures.

5. The truck cover system of claim 4, wherein the plurality of front apertures are vertically offset from the plurality of slots when the truck cover system is employed.

6. The truck cover system of claim 5, wherein the connecting member comprises a pivot member coupled to an elongated member, wherein the pivot member is configured to receive the main fastener and wherein the elongated member is configured to rotate with respect to the pivot member such that the elongated member is rotatable into one of the plurality of slots when the clamp structure is rotated with respect to the latch structure.

7. The truck cover system of claim 1, wherein the latch structure further comprises:
a plurality of beams extending at least partially across the central channel so as to secure the latch insert when the latch insert is inserted within the central channel.

8. The truck cover system of claim 1, wherein the latch structure further comprises:
a plurality of separators extending at least partially across the central channel.

9. A latch structure for use in a truck cover system, the latch structure comprising:
a rail interface configured to couple to a rail of the truck cover system, the rail defining a cover slot configured to couple to a cover that extends over a truck bed of a truck;
a latch body including a plurality of laterally-offset locking positions, wherein a connecting member of a clamp structure is configured to lock to one of the plurality of laterally-offset locking positions, wherein the clamp structure is configured to couple to a truck wall of the truck, and wherein the connecting member extends in the vertical direction when the truck cover is employed and the clamp structure is coupled to the truck wall;
a central channel extending laterally across the latch structure, wherein the connecting member is inserted into the central channel in order to lock the connecting member to one of the plurality of laterally-offset locking positions; and
a latch insert configured to be inserted at least partially within the central channel and to intersect each of the plurality of laterally-offset locking positions.

10. The latch structure of claim 9, further comprising:
a plurality of slots positioned on the latch body corresponding to the plurality of laterally-offset locking positions, the plurality of slots allowing the clamp structure to rotate vertically upward with respect to the latch structure such that the clamp structure may become at least partially flush with the latch structure while the clamp structure is coupled to the latch structure.

11. The latch structure of claim 10, further comprising:
a plurality of front apertures positioned on the latch body corresponding to the plurality of laterally-offset locking positions; and
a plurality of rear apertures positioned on the latch body corresponding to the plurality of laterally-offset locking positions, wherein the plurality of front apertures and the plurality of rear apertures allow locking of the connecting member to each of the plurality of laterally-offset locking positions using a main fastener.

12. The latch structure of claim 11, wherein the main fastener includes a bolt and a nut, wherein the bolt is insertable through one or both of the plurality of front apertures and the plurality of rear apertures.

13. The latch structure of claim 12, wherein the plurality of front apertures are vertically offset from the plurality of slots when the truck cover system is employed.

14. The latch structure of claim 13, wherein the connecting member comprises a pivot member coupled to an elongated member, wherein the pivot member is configured to receive the main fastener and wherein the elongated member is configured to rotate with respect to the pivot member such that the elongated member is rotatable into one of the plurality of slots when the clamp structure is rotated with respect to the latch structure.

15. The latch structure of claim 9, further comprising:
a plurality of beams extending at least partially across the central channel so as to secure the latch insert when the latch insert is inserted within the central channel.

16. The latch structure of claim 9, further comprising:
a plurality of separators extending at least partially across the central channel.

* * * * *